United States Patent [19]

Maxey

[11] 4,275,424
[45] Jun. 23, 1981

[54] SCANNING TYPE MAGNETIC RECORDER AND CASSETTE

[75] Inventor: Alexander R. Maxey, Palo Alto, Calif.

[73] Assignee: Arvin Industries, Inc., Columbus, Ind.

[21] Appl. No.: 55,208

[22] Filed: Jul. 5, 1979

Related U.S. Application Data

[63] Continuation-in-part of Ser. No. 945,421, Sep. 25, 1978, Pat. No. 4,179,717, which is a continuation-in-part of Ser. No. 874,118, Feb. 1, 1978, Pat. No. 4,139,873.

[51] Int. Cl.³ .................. G11B 15/66; G11B 23/10
[52] U.S. Cl. .................................. 360/85; 360/132; 242/199
[58] Field of Search .................. 360/85, 132; 242/199

[56] References Cited

U.S. PATENT DOCUMENTS 3,305,186  2/1967  Burdorf et al. ................ 242/192

FOREIGN PATENT DOCUMENTS 46-8515  3/1971  Japan ................................ 360/85

Primary Examiner—Robert S. Tupper
Attorney, Agent, or Firm—Biebel, French & Nauman

[57] ABSTRACT

A scanning type magnetic tape recorder comprises a deck including a rotatable scanning assembly mounted and at least one transducer and at least one capstan mounted in spaced relation to one side of the scanning assembly. A rotary drive is connected to rotate the transducer and the capstan at correlated speeds. A cassette, having a supply hub and a take-up hub in spaced relation, contains a quantity of tape movable between the hubs, and a drive belt passing in contact with portions of the tape wound on both the hubs. The cassette having an opening at one end of a size to fit around said scanning assembly.

Guides in the cassette locate a length of the tape between the hubs, away from the belt and across the opening in position to form a turn around the scanning assembly in response to placement of the cassette on said deck. A first roller guides a length of the belt where separated from the tape to one side of said opening for driving by the one capstan.

In one embodiment the cassette has supply and take-up hubs mounted in side by side relation spaced from the opening, and in a second embodiment the supply and take-up hubs are mounted in longitudinally spaced relation with respect to each other and to the opening. The cassettes of each embodiment have one end of common dimensions compatible with the receiver on said deck.

11 Claims, 9 Drawing Figures

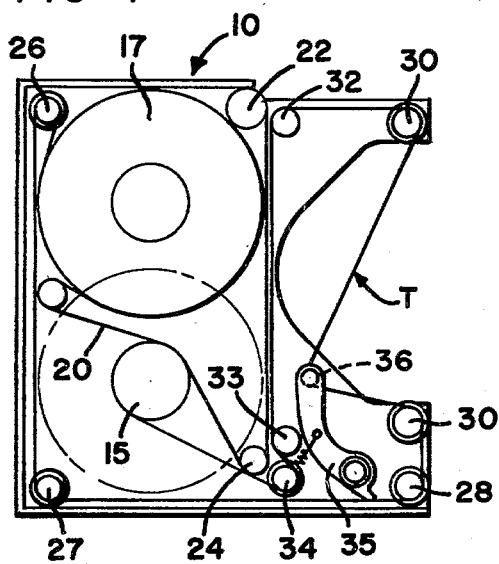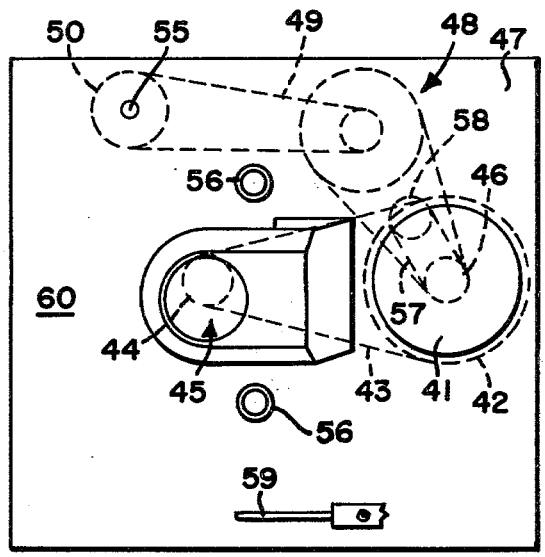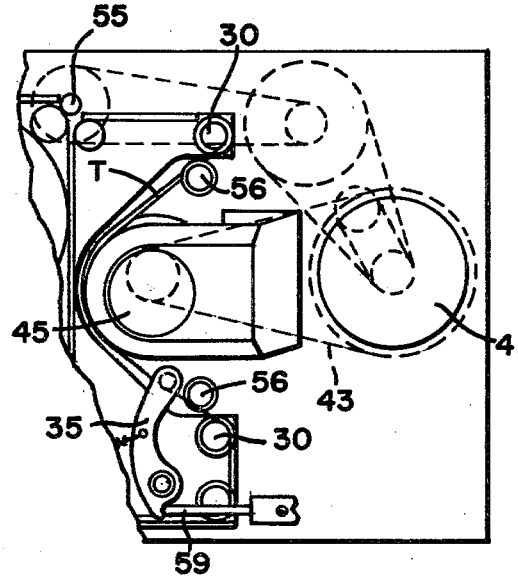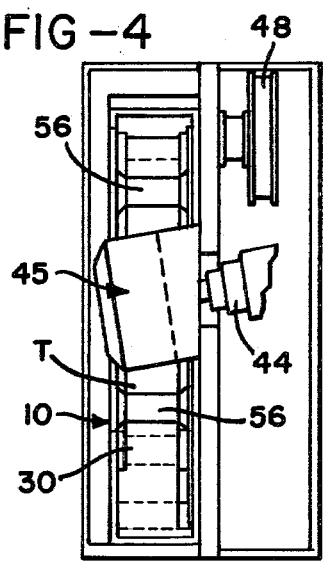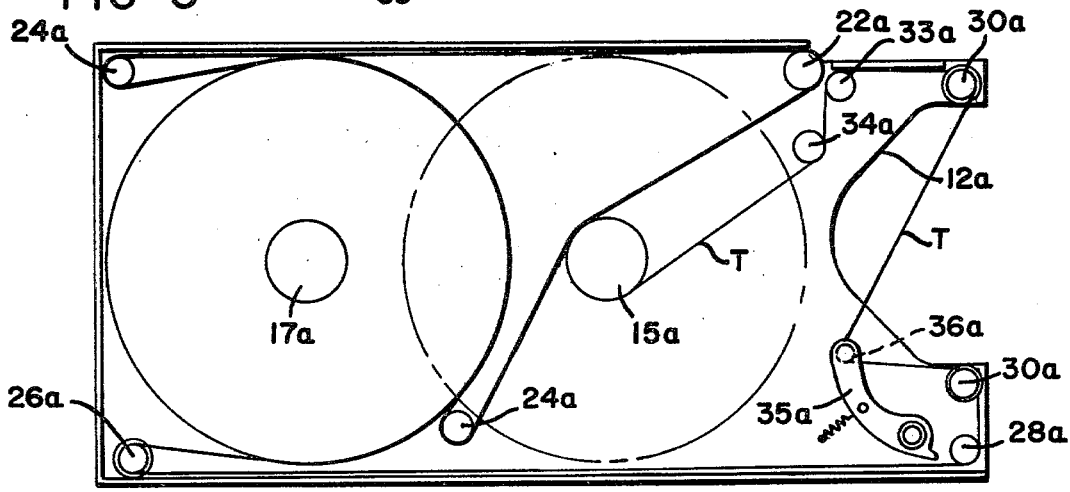

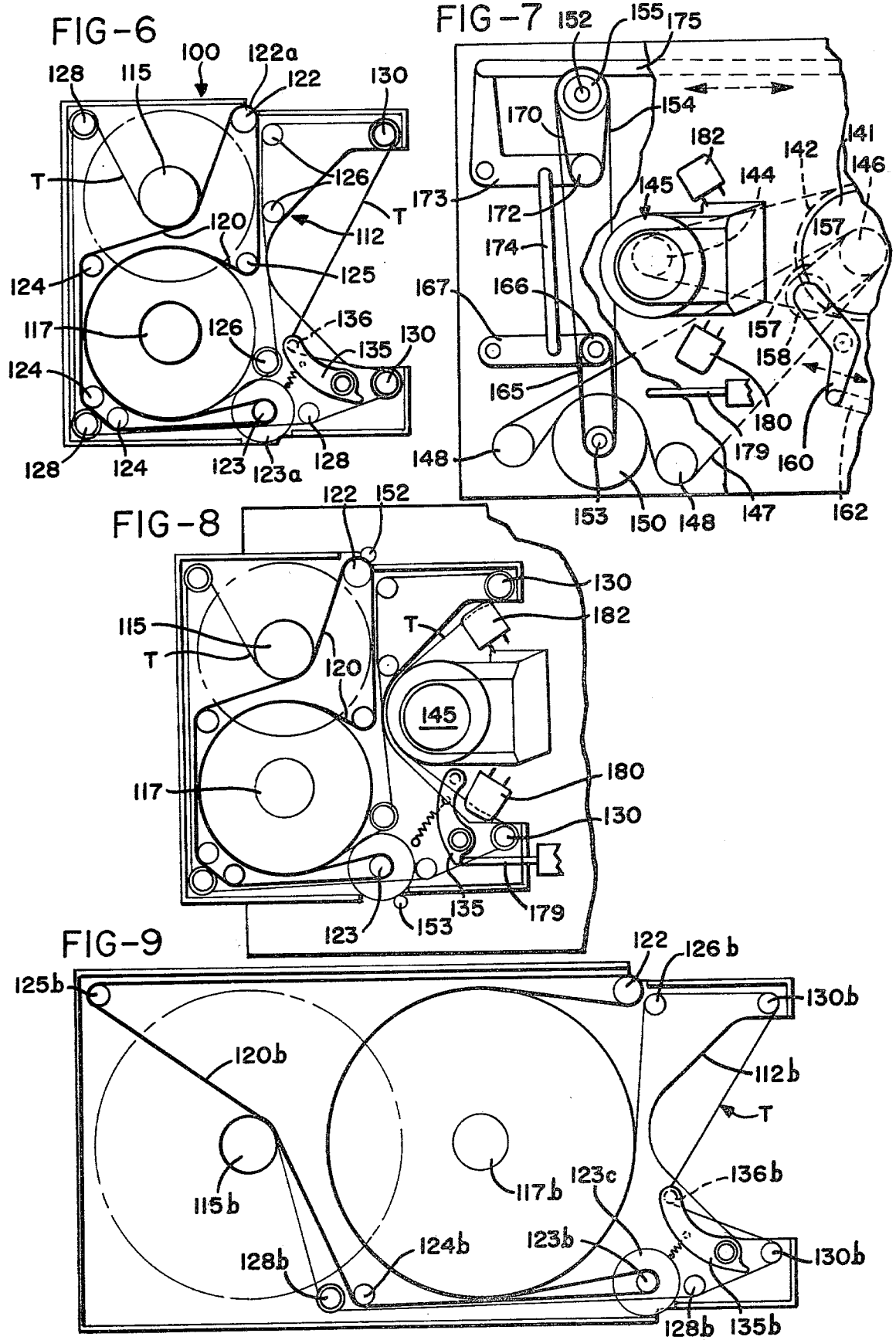

SCANNING TYPE MAGNETIC RECORDER AND CASSETTE

RELATED APPLICATIONS

This application is a continuation-in-part of application No. 945,421, filed Sept. 25, 1978, now U.S. Pat. No. 4,179,717, which in turn is a continuation-in-part of application No. 874,118, filed Feb. 1, 1978, now U.S. Pat. No. 4,139,873.

BACKGROUND OF THE INVENTION

This invention relates to a wide band magnetic recording system, and particularly to types of cassettes and tape handling systems for magnetic recorders in which the transducer heads are continuously scanned at a relatively higher velocity past a moving record media, such as recording tape, which is moving at a substantially lesser velocity.

Details of the scanners and tape scanning formats are disclosed in the related applications.

SUMMARY OF THE INVENTION

The present invention provides novel cassette arrangements in each of which the amount of recording media, e.g., magnetic tape, occupies a substantially high percentage of the total volume of the cassette, which results in a wide bandwidth recorder which provides maximum capacity for the space which it occupies. The novel scanner, and tape handling mechanisms of the recorder provide a type of segmented helical scan system in which recording tape changes elevation only an insignificant amount. This in turn permits use of a relatively thin cassette in a wide band width recorder which is fully capable of color video recording. The scanner incorporates at least three, preferably four, simultaneously rotating transducer heads mounted spaced equally around a rotating scanning drum, and also spaced longitudinally of the axis of rotation of the drum. The heads are spaced apart far enough in the axial direction that each head revolves in a scanning circle or orbit which traces separate helical scan paths longitudinally of the tape. Thus, the successive scans, or scanning paths, of any one head never occupy a position on the tape overlapping scans, or scanning paths, of the other heads.

The scanner tape interface uses significantly less than 180° of tape turn. Thus, a short length of tape can be exposed along a side of a cassette, and the cassette need be inserted only slightly around the scanner to achieve the necessary interface. It is not necessary to draw a loop from the cassette, nor to provide any complex guide rollers, etc., in the cassette which would require precision location to the scanner.

In the forms of cassette described, the tape is guided and fed by a belt system, generally of the type disclosed in U.S. Pat. No. 3,305,186. This system is sometimes known as the Isoelastic Drive. It maintains the tape under complete control and proper tension at all times, and in one embodiment utilizes a pair of drive capstans engaging rolls on opposite sides of the cassette to achieve desired constant tension in the span of tape extending between the supply and take-up rolls.

BRIEF DESCRIPTION OF THE DRAWINGS

FIG. 1 is a plan view of a cassette of recording tape as provided by the invention, and FIG. 2 is a plan view of the deck, drive, and scanner aligned with the cassette;

FIG. 3 is a plan view of the cassette engaged on the deck;

FIG. 4 is an end view of FIG. 3;

FIG. 5 is a plan view of a larger capacity cassette which is also usable on the deck shown in FIG. 2;

FIG. 6 is a plan view of another embodiment of cassette, and

FIG. 7 is a plan view of a corresponding deck and drive aligned with the cassette;

FIG. 8 is a plan view of the modified cassette engaged with the deck; and

FIG. 9 is a plan view of a larger version of the other embodiment of cassette.

DESCRIPTION OF THE PREFERRED EMBODIMENT

FIGS. 1, 2, 3, and 4 illustrate the general arrangement of a small size wide bandwidth tape recording unit embodying the features of the present invention. Referring to FIG. 1, the cassette comprises a generally rectangular housing 10 from which the cover (top) is removed to show details of its interior. A wide generally V-shaped opening 12 is provided at one end of the cassette, for fitting partly around the scanner assembly as later described.

Mounted in the housing 10 is a take-up spool 15 having one end of the tape T fastened thereto, and a supply spool 17 mounted in spaced relation to the take-up spool 15, and having a quantity of the tape wound thereon. In FIG. 1, the supply spool 17 is shown full of tape, illustrated in solid lines, and the take-up spool 45 is shown empty, its diameter indicated in solid lines. The dot-dash lines indicate the diameter of a full take-up spool. It will be noted that there is some overlap of the full diameters, however, as one enlarges the other decreases such that there is no interference in fact.

Tape is transported from the supply spool to the take-up spool by the motion of a driving belt 20 which may be of the type disclosed in U.S. Pat. No. 3,305,186. This belt extends around a driven capstan roller 22 and around two guide rollers 24 which guide belt 20, as shown in FIG. 1, around the tape on each of the spools, into the space therebetween, and back to the driven roller 22. Thus, constant speed rotation of the capstan roller 22 produces a constant velocity movement of the driving belt 20, and it in turn advances the recording tape T at a constant velocity. The tape leaves the supply pack on spool 17 and passes around guide rollers 26, 27, 28 (in that order), thence around a pair of flanged straightening and guiding posts 30, then to further guide rollers 32, 33 and 34 and on to the take-up spool 15. Preferably at least rollers 26 and 34 are flanged to assure alignment of the tape moving to and from the rolls on the spools. The spring pulled pivoted arm 35 carries a roller 36 which draws the tape partly inward as shown.

The plan view FIG. 2 of the deck 40 shows the drive motor 41 driving pulley 42 which is coupled via belt 43 to a pulley 44 attached to the shaft of the scanner assembly 45. The motor also drives a smaller pulley 46 which is connected by belt 47 to an idler set 48, which in turn is connected via belt 49 to the tape drive pulley 50. It in turn, drives a capstan 55 which is journalled in the deck and operates, as later described, to drive the capstan roller 22. On opposite sides of the scanner assembly, there are mounted primary straightening and guide posts 56 and 56 which function to guide the recording tape T precisely onto and off the scanner assembly. A protective cover (omitted from FIG. 2) may extend over the scanner assembly as well as the capstan and guide posts. The drive motor and the above described pulleys and connecting belts are all housed within the deck.

When the cassette 10 is fitted to the receiver section 60 of the deck (FIG. 3) arm 35 engages a pin 59 and carries roller 36 forward away from the tape. The free span of the recording tape is drawn around the scanner 15 and into contact with the primary guide posts 56 precisely locating the recording tape with respect to the scanner. At the same time, the capstan 55 engages the drive belt 20 at the capstan roller 22. Thus the motor rotates the scanner at the desired speed, and also, through the capstan and the drive belt, rotates both the supply pack of recording tape and the take-up pack (clockwise as viewed in FIG. 1). The take-up pack gradually enlarges as recording continues, thereby moving the recording tape past the scanner at a constant velocity, which is correctly correlated to scanner rotation. As the cassette is inserted and locked the free span of the recording tape is automatically drawn correctly around the scanner assembly and the primary guide posts.

FIG. 5 shows a cassette 10A of much larger capacity, but which is totally compatible with the deck and receiver shown in FIG. 2. Parts similar to the smaller cassette are indicated with the same reference numerals having the suffix a. Thus the cassette 10A has an opening 12a at one end, in this case located at a smaller dimension of the cassette.

The take-up spool 15a is located inwardly of the opening and when full it occupies essentially the entire width as shown in dash lines. The supply spool 17a is located beyond the take-up, as shown. The end of the cassette including the opening 12a has the same dimensions as the corresponding end of the smaller cassette, thus either fits to the deck. The capstan roller 22a likewise is located to engage the belt 20a with the capstan 55.

Tape leaves the supply hub or spool 17a and passes around guide rollers 26a, 28a, guiding posts 30a between which the tape spans the opening 12a, then around further rollers 33a and 34a to the take up hub or spool 15a. The driving belt 20a passes from the capstan roller 22a, generally parallel to a side of the cassette and then around guide rollers 24a which guide the belt into contact with the surface of the tape packs on the supply and take-up hubs, in a generally triangular path which has one side parallel to a side of the cassette and the other sides extending at an angle (which changes as the tape moves) generally toward an opposite side of the cassette. This belt path has the same characteristics as the belt path in the smaller cassette, but rotated 90°, as is seen by comparing FIGS. 1 and 5.

The stretchable belt 57 and control roller 58, shown schematically in FIG. 2, represent a speed adjusting device which may be of the type disclosed in U.S. Pat. No. 4,107,744. Changing the distance between the centers of roller 58 and pulley 46 will change the thickness of belt 57, and therefore change the effective radius of pulley 46 acting on belt 47. This in turn can provide a control of the speed difference within a relatively small range between the scanner 45 and the capstan 55.

FIG. 6 and FIG. 7 show a modified form of cassette and deck, respectively, wherein a dual capstan drive is employed. This arrangement offers very precise control over tape movement, and may be preferred in installations where it is particularly desirable to maintain with high accuracy tension in and control over the span of tape moving past the scanner. Where possible reference numerals in the 100 series are used to indicate parts comparable, or identical, to those of the embodiment shown in FIGS. 1-5.

Thus, referring to FIG. 6, the cassette 100 has a rather wide generally V-shaped opening 112 at its one end for fitting around the scanner assembly. In the cassette there is a take-up spool 115 having one end of the tape T fastened to it, and a supply spool 117 mounted in spaced relation to the take-up spool, with a quantity of the tape wound thereon. Again, the supply spool is shown full of tape in solid lines, and the dot-dash lines around the take-up spool indicate the diameter of a full take-up spool when the tape has been almost completely transferred thereto.

The tape is transported between the spools by the motion of a driving belt 120, which again may be of the type disclosed in U.S. Pat. No. 3,305,186. This belt is wrapped around a first driven capstan roller 122, a second capstan roller 123 at the opposite side of the cassette, around three guide rollers 124 which are located near the end of the cassette, one centrally and two at a corner, and around a further central guide roller 125 which is located approximately midway between the two capstans. The belt, as can be seen in FIG. 6, also wraps around a substantial extent of the tape packs on each of the two spools. As shown, there is slightly less than 90° wrap or contact of the tape with the belt at the take-up spool, and in excess of 270° of wrap of the belt around the tape pack on the supply spool. As feeding of the tape progresses, these conditions will change, but at all times there is substantial contact between the driving and control belt 120 and both of the tape packs on the spools. Thus, constant speed input to the driving belt 120 produces a constant velocity movement of the recording tape T.

The tape leaves the supply pack on spool 117 and passes around guide rollers 126, thence around flanged straightening and guiding posts 130, one on each side of the opening in the cassette which defines the V-shaped entry for the scanning assembly. The span of tape crossing this opening is held in a taut condition within the cassette by a roller 136 carried on the end of a spring biased arm 135 which is pivoted to the cassette near one of the guide posts 130, in the same fashion as previously described. The tape passes from the second guide post outside of the second capstan 123 around guide rollers 128, thence to the tape pack on the take-up spool 115.

The capstan roller 122 is fixed to a common shaft with a driven roll 122a which is intended to be friction driven by a capstan post, later described, which is mounted on the deck. Similarly, the capstan 123 is carried on and rotated by a shaft which carries a driven roller 123a which is intended to be friction driven from a second drive capstan spindle on the deck. It will be noted that the rollers 122a and 123a project slightly through small openings at opposite sides of the cassette for this purpose.

As shown in FIG. 7, the deck includes a drive motor 141 which, first of all, drives a larger pulley 142 that is connected through a belt 143 and smaller pulley 144 with the scanner 145. The motor also drives a smaller pulley 146 which is connected through a drive belt 147 to a driven pulley 150, passing around a pair of idler pulleys 148 which cause the belt 147 to wrap around the driven pulley 150 as shown. The pulley 150 in turn is mounted to a shaft which carries a capstan 153. This capstan is linked through a connecting belt 154 to a pulley 155 on the opposite side of the deck, and the pulley 155 in turn is fixed to a shaft carrying the other capstan 152.

Limited variation in the speed ratio between the capstan drive belt 147 and the motor 141 is provided in the same manner as previously mentioned, using a stretchable belt 157 which passes around the motor pulley 146 inside the belt 147, and a movable roller 158 which can be moved toward and away from the motor pulley 146, thereby lengthening or shortening the belt and causing changes in its thickness which in turn change slightly the effective radius of the pulley 146 acting upon belt 147. Control over the position of roller 158 is provided by a pivotally mounted crank 160 which is controlled through the motion of a rod 162. That rod in turn can be moved back and forth, as indicated by the double headed arrow, under any convenient control, for example a small reversible gear head motor (not shown).

In similar fashion, the relative speeds of the capstans 152 and 153 can be adjusted slightly in order to provide for control over the tension in the tape, particularly the span of tape between the two packs on the rollers in the capstan. A stretchable belt 165 is located between the pulley on the capstan shaft 153 and the connecting belt 154, and a roller 166 controls the length/thickness of belt 165. Similarly, a second stretchable belt 170 is mounted between the connecting belt 154 and pulley 155, and a roller 172 controls the length/thickness of belt 170. Roller 166 is mounted on a pivotable arm 167, and roller 172 is mounted at one end of a pivotable crank 173. A link 174 connects crank 173 with the arm or link 167, and the other end of crank 173 is connected to a control rod 175 which can be moved, as by a reversible gear head motor (not shown) back and forth as indicated by the double headed arrow next to it, in order to adjust the positions of the two rollers 166 and 172. As one of the belts 165, 170 is lengthened, the other is shortened, thereby providing changes in the effective radius of the two rollers acting upon the connecting belt 154, and thereby adjusting slightly the small difference in speed between the capstans 152 and 153. The purpose of such adjustment is explained in U.S. Pat. No. 3,305,186.

FIG. 8 shows the cassette 100 fitted to the deck. In this case the capstan 152 engages the roller 122a, and the capstan 153 engages the roller 123a. As the cassette is inserted onto the deck, the pin 179 engages arm 135, swinging roller 136 forward with respect to the V-shaped opening, and allowing the tape T to form a turn of slightly in excess of 90° around the scanner 145. In this embodiment the stationary guide posts may be in the form of stationary heads 180 and 182, which may also have flanges for guiding the tape precisely around the scanner. These heads can follow longitudinal tracks on the tape, as for control or audio recording purposes, and one may function as an erase head to reorient the tape before it passes to the scanner.

FIG. 9, as in the case of FIG. 5, illustrates a modified form of cassette which is capable of carrying a substantially larger supply of tape. Here, the same reference numerals as used in FIG. 6 are applied to like parts, with the suffix b thereafter. The tape T leaves the tape pack on the supply spool 117b and passes around a guide roller 126b and across the opening 112b in the end of the larger cassette, moving across the exit and entrance flanged guide posts 130b. The moving roller 136b, carried on the pivotally mounted arm 135b, holds the tape within the end of the cassette when the set is not fitted to the deck. The tape passes from the guide posts around rollers 128b, to the take-up spool 115b. The belt 120b for controlling the transport motion of the tape, passes around a driven roller 122, around the pack of tape on the supply spool, around a second roller 123b which is fixed to the same shaft as the second driven capstan roller 123c, and thence over the center guide roller 124b and the corner guide roller 125b, first passing around the tape on the take-up spool 115b.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A scanning type magnetic tape recorder comprising:
   a deck,
   a rotatable scanning assembly mounted on said deck and including at least one transducer,
   at least one capstan mounted on said deck in spaced relation to one side of said scanning assembly,
   means connected to rotate said transducer and said capstan at correlated speeds,
   a receiver for a tape cassette; and
   a cassette having a supply hub and a take-up hub in spaced relation and containing a quantity of tape therebetween,
   said cassette having an opening at one end of a size to fit around said scanning assembly,
   a drive belt passing in contact with portions of the tape wound on both said hubs,
   guides in said cassette locating a length of the tape between said hubs away from said belt and across said opening in position to form a turn around said scanning assembly in response to placement of said cassette on said deck,
   and a first roller guiding a length of said belt where separated from said tape to one side of said opening for driving by said one capstan.

2. A recorder as defined in claim 1,
   wherein said cassette has said supply and take-up hubs mounted in side by side relation spaced from said one end to provide a relatively small limited recording time cassette cooperable with said deck.

3. A recorder as defined in claim 1,
   wherein said cassette has said supply and take-up hubs mounted in longitudinally spaced relation with respect to each other and to said one end to accommodate substantial amounts of tape on said hubs for extended recording time.

4. A recorder as defined in claims 2 or 3 wherein the cassettes have said one end of common dimensions compatible with said receiver on said deck.

5. A recorder as defined in claims 1, 2, or 3,
   including a second capstan mounted on said deck on the opposite side of said scanning assembly from said one capstan,
   means for driving said capstans at predetermined related speeds,
   and said cassette incorporating a second pinch roller guiding said belt past said one end of said cassette at the other side of said opening for driving by said second capstan thereby to achieve a differential in the tension of the belt portions contacting the tape around the respective hubs.

6. A cassette for a scanning type tape recorder having a rotating transducer scanning assembly, said cassette comprising a cassette body supporting a supply hub and a take-up hub in spaced relation and containing a quantity of tape therebetween, said cassette having an opening at one end of a size to fit around the scanning assembly, a drive belt passing in contact with portions of the tape wound on both said hubs, guides in said cassette locating a length of the tape between said hubs away from said belt and across said opening in position to form a turn around the scanning assembly in response to placement of said cassette in predetermined position adjacent the scanning assembly, and a first roller guiding a length of said belt where separated from said tape past said one end of said cassette to one side of said opening for driving said belt by a capstan.

7. A tape recording cassette as defined in claim 6, said hubs being supported in side by side relation in said body spaced from said one end, said belt extending in a generally triangular path the base of which is parallel to said one end of said body and the sides of which extend toward the end of said body opposite said one end and into contact with the portions of tape wound on said hubs.

8. A tape recording cassette as defined in claim 6, said hubs being supported in longitudinally spaced relation with respect to each other and to said one end, said belt extending in a generally triangular path the base of which is parallel to one side of said body and the sides of which extend toward the other side of said body and into contact with the portions of tape wound on said hubs.

9. A tape recording cassette as defined in claims 7 or 8, wherein the cassettes have said one end of common dimensions to be equally compatible with the same scanning assembly.

10. A tape recording cassette as defined in claims 7 or 8, wherein said first roller is located at one corner of the base of the triangular belt path at said one end of said cassette body.

11. A tape recording cassette as defined in claims 7 or 8, including a second roller guiding the portion of said belt from between sides of the belt path which contact the tape on said hubs to a location at the other side of said opening from said one roller for also driving said belt by a second capstan.

* * * * *